United States Patent [19]

Liu et al.

[11] Patent Number: 4,737,546

[45] Date of Patent: Apr. 12, 1988

[54] MOLDABLE POLYCARBONATE RESIN AND COPOLYESTER-CARBONATE COMPOSITIONS OF IMPROVED PROCESSABILITY

[75] Inventors: Ping Y. Liu, Naperville, Ill.; Omar M. Boutni, Mt. Vernon, Ind.

[73] Assignee: General Electric Company, Mt. Vernon, Ind.

[21] Appl. No.: 896,925

[22] Filed: Aug. 15, 1986

[51] Int. Cl.$^4$ ............................................. C08L 69/00
[52] U.S. Cl. ..................................... 525/148; 525/67; 525/92
[58] Field of Search ........................... 525/148, 67, 92

[56] References Cited

U.S. PATENT DOCUMENTS

| | | | |
|---|---|---|---|
| 3,882,192 | 5/1975 | Elghani | 525/67 |
| 4,145,373 | 3/1979 | Baron | 528/196 |
| 4,218,547 | 8/1980 | Ellis | 525/148 |
| 4,226,950 | 10/1980 | Holub | 525/67 |
| 4,579,910 | 4/1986 | Giles | 525/148 |

FOREIGN PATENT DOCUMENTS 49-045959  5/1974  Japan ................................. 525/148

Primary Examiner—Patricia A. Short
Attorney, Agent, or Firm—Joseph T. Eisele; Martin B. Barancik

[57] ABSTRACT

The melt flow of polycarbonate resin molding compositions is improved by the addition of an ethylene-vinyl acetate copolymer, without adversely affecting the impact strength of articles molded from the improved composition.

3 Claims, No Drawings

MOLDABLE POLYCARBONATE RESIN AND COPOLYESTER-CARBONATE COMPOSITIONS OF IMPROVED PROCESSABILITY

BACKGROUND OF THE INVENTION

1. Field of the Invention

The invention relates to thermoplastic resin compositions and more particularly relates to improved polycarbonate and copolyester-carbonate resin molding compositions and articles molded therefrom and the method of improvement.

2. Brief Description of the Prior Art

Aromatic polycarbonate resins are a well known class of synthetic polymeric resins, generally prepared by the reaction of a polyhydric phenol with a carbonate precursor; see for example U.S. Pat. No. 3,989,672. Although such polycarbonate resins have been found to be thermoplastically moldable under a broad range of molding conditions, some polycarbonate resin compositions are not suitable for use in all molding operations because of a relatively high melt-flow behavior. Certain additives such as amine type aliphatic esters are known, which when admixed with many polycarbonate molding resins, lower the melt viscosity of the composition. However, the molded articles prepared from these compositions generally exhibit lowered impact strength because the polycarbonate is degraded by these additives.

We have discovered that olefin/vinyl carboxylate copolymers such as ethylene-vinyl acetate copolymers, when added to thermoplastic, moldable polycarbonate and copolyester-carbonate resins, are effective in reducing melt viscosities to a considerable degree, i.e.; by as much as two-thirds as measured by melt flow. This greatly improves processability of the resin in given molding operations. Unexpectedly, the improved processability is obtained without a significant loss of impact strength in molded articles prepared from the compositions of the invention. In fact, in some instances the impact strength may show improvement.

Ethylene-vinyl acetate copolymers have been used as additives in a minor proportion, to improve the stress crack resistance of polycarbonates to sterilizations conditions; see U.S. Pat. No. 4,145,373.

SUMMARY OF THE INVENTION

The invention comprises a moldable thermoplastic polycarbonate or copolyester-carbonate resin composition of improved processability, which comprises;
a thermoplastic polycarbonate or copolyester-carbonate resin; and
a melt-flow increasing proportion of an olefin vinyl carboxylate copolymer.

The compositions of the invention are useful for molding articles such as tool housings and automotive parts by known techniques, for example injection molding.

DETAILED DESCRIPTION OF THE PREFERRED EMBODIMENTS OF THE INVENTION

A wide variety of polycarbonate resins are known as are methods of their preparation, which are thermoplastically moldable. Representative of such polycarbonate resins are the aromatic carbonate polymers, i.e.; carbonate homopolymers of dihydric phenols, carbonate copolymers of two different dihydric phenols or copolymers of such dihydric phenols with glycols, such as ethylene glycol or propylene glycol.

These polycarbonates and their preparation are known in the art and are described, for example, in U.S. Pat. Nos. 3,028,365; 3,334,154; 3,275,601; 3,915,926; 4,444,935; 3,169,121; and 4,465,820, all of which are incorporated herein by reference. Generally, such aromatic carbonate polymers are prepared by reacting a dihydric phenol with a carbonate precursor. The dihydric phenols employed are known dihydric phenols in which the reactive groups are the two phenolic hydroxyl groups. Some of these are represented by the general formula:

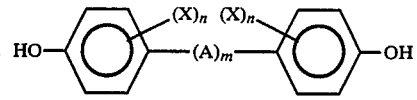

wherein A is a divalent hydrocarbon radical containing from 1 to about 15 carbon atoms; a substituted divalent hydrocarbon radical containing from 1 to about 15 carbon atoms and substituent groups such as halogen;

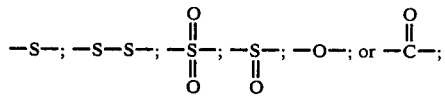

and wherein each X is independently selected from the group consisting of halogen, and a monovalent hydrocarbon radical such as an alkyl group of from 1 to about 8 carbon atoms, an aryl group of from 6–18 carbon atoms, an aralkyl group of from 7 to about 14 carbon atoms, an aralkyl group of from 7 to about 14 carbon atoms, an oxyalkyl group of from 1 to about 8 carbon atoms, or an oxyaryl group of from 6 to 18 carbon atoms; and wherein m is zero or 1 and n is an integer of from 0 to 4.

Typical of some of the dihydric phenols that can be employed are bis-phenols such as bis(4-hydroxyphenol)methane, 2,2-bis(4-hydroxyphenol)propane (also known as bisphenol A), 2,2-bis(4-hydroxy-3-methylphenyl)propane, 4,4-bis(4-hydroxyphenol)heptane, 2,2-bis(4-hydroxy-3,5-dichlorophenyl)propane, 2,2-bis(4-hydroxy-3,5-dichlorophenyl)propane, 2,2-bis(4-hydroxy-3,5-dibromophenyl)propane, and the like; dihydric phenol ethers such as bis(4-hydroxyphenol)ether, bis(3,5-dichloro-4-hydroxyphenyl)ether, and the like; dihydroxydiphenyls such as p,p'-dihydroxydiphenyl, 3,3'-dichloro-4,4'-dihydroxydiphenyl, and the like; dihydroxyaryl sulfones such as bis(4-hydroxyphenyl)sulfone, bis(3,5-dimethyl-4-hydroxyphenyl)sulfone, and the like; dihydroxy benzenes, resorcinol, hydroquinone, halo- and alkyl-substituted dihydroxy benzenes such as 1,4-dihydroxy-2,5-dichlorobenzene, 1,4-dihydroxy-3-methylbenzene, and the like; and dihydroxy diphenyl sulfides and sulfoxides such as bis(4-hydroxy-phenol)sulfide and bis(4-hydroxyphenyl)sulfoxide, bis(3,5-dibromo-4-hydroxyphenyl)sulfoxide, and the like. A variety of additional dihydric phenols are also available and are disclosed in U.S. Pat. Nos. 2,999,835; 3,028,365 and 3,153,008, all of which are incorporated herein by reference. It is, of course, possible to employ two or more different dihydric phenols or combination of a dihydric phenol with glycol.

The carbonate precursor may be either a carbonyl halide, a diaryl carbonate or a bishaloformate. The carbonyl halides include carbonyl bromide, carbonyl chloride, and mixtures thereof. The bishaloformates suitable for use include the bishaloformates of dihydric phenols such as bischloroformates of 2,2-bis(4-hydroxyphenyl)-propane, 2,2-bis(4-hydroxy-3,5-dichlorophenyl)propane, hydroquinone, and the like, or bishaloformates of glycols such as bishaloformates of ethylene glycol, and the like. While all of the above carbonate precursors are useful, carbonyl chloride, also known as phosgene, is preferred.

Also included within the scope of the present invention are the use of high molecular weight thermoplastic randomly branched polycarbonates. These randomly branched polycarbonates are prepared by coreacting a polyfunctional organic compound with the aforedescribed dihydric phenol and carbonate precursor. The polyfunctional organic compounds useful in making the branched polycarbonates are set forth in U.S. Pat. Nos. 3,635,895 and 4,001,184, which are incorporated herein by reference. These polyfunctional compounds are generally aromatic and contain at least three functional groups which are carboxylic, carboxylic anhydride, haloformyl or mixtures thereof. Some nonlimiting examples of these polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are trimellitic anhydride or trimellitic acid or their haloformyl derivatives. Also included herein are thermoplastic polycarbonate resins which are blends of a linear polycarbonate and a branched polycarbonate.

The polycarbonate resin components of the compositions of the invention are also represented by so-called "end-capped" polycarbonates. More specifically, it is known that in certain procedures of producing aromatic carbonate polymers from dihydric phenols and a carbonate precursor such as phosgene small amounts of certain molecular weight regulators or chain terminators can be used to provide end or terminal groups on the carbonate polymer and thereby control the molecular weight of the polycarbonate.

A molecular weight regulator, i.e.; a chain stopper, is generally added to the reactants prior to or during the contacting of them with a carbonate precursor. Useful molecular weight regulators include, but are not limited to, monohydric phenols such as phenol, chroman-I, paratertiarybutylphenyl, and the like. Techniques for the control of molecular weight are well known in the art and may be used for controlling the molecular weight of the polycarbonate resin components of the compositions of the invention.

The prior art also discloses several other types of compounds that act as chain terminators for the carbonate polymers. Thus, U.S. Pat. No. 3,085,992 discloses alkanol amines as chain terminators; U.S. Pat. No. 3,399,172 teaches imides as chain terminators; U.S. Pat. No. 3,275,601 discloses that aniline and methyl aniline function as chain terminators in the interfacial polymerization process for producing polycarbonates; and U.S. Pat. No. 4,001,184 discloses primary and secondary amines as molecular weight regulators for polycarbonate. Furthermore, U.S. Pat. No. 3,028,365 discloses that aromatic amines and other monofunctional compounds can be used to control or regulate the molecular weight of the polycarbonates, thereby forming aryl carbamate terminal groups. Aromatic polycarbonates having carbamate end groups are disclosed in U.S. Pat. No. 4,111,910. These polycarbonates are prepared using a terminating amount of ammonia, ammonium compounds, primary cycloaklyl, aliphatic or aralkyl amines and secondary cycloalkyl, alkyl or aralkyl amines.

In addition to improving the processability of polycarbonate resins, the method of the invention may be used to the same advantage to improve copolyester-carbonate resin molding compositions. Such compositions are well known as are the methods of their preparation; see for example the descriptions in U.S. Pat. Nos. 3,169,121; 4,476,294; and 4,487,917, the disclosures of which are hereby incorporated by reference thereto.

All of the above-described polycarbonate and copolyester-carbonate resins are examples of polycarbonate resins which may be used as components of the molding compositions of the invention. Preferred polycarbonate resins employed in blends have an intrinsic viscosity between about 0.3 and 1.2 deciliters/gram (dl/g), most preferably from 0.40 to 0.65 dl/g as measured at a temperature of 25° C. in methylene chloride or a like solvent. The thermoplastic polycarbonate resins may also be compounded with conventional molding aids such as, for example, antioxidants; antistatic agents; inert fillers such as glass, talc, mica, and clay; ultraviolet radiation absorbers such as the benzophenones, benzotriazoles, and the like; hydrolytic stabilizers such as the epoxides disclosed in U.S. Pat. Nos. 3,489,716, 4,138,379 and 3,839,247, all of which are incorporated herein by reference; color stabilizers such as the organophosphites; thermal stabilizers such as phosphite; mold release agents and flame retardants. Some particularly useful flame retardants are the alkali and alkaline earth metal salts of sulfonic acids. These types of flame retardants are disclosed in U.S. Pat. Nos. 3,933,734; 3,931,100; 3,978,024; 3,948,851; 3,926,980; 3,919,167; 3,909,490; 3,953,396; 3,953,300; 3,917,559; 3,951,910 and 3,940,366, all of which are hereby incorporated herein by reference.

In a preferred embodiment of the invention an impact strength enhancing proportion of an impact modifier may be added to the compositions of the invention. Representative of such impact modifiers are selectively hydrogenated linear, sequential or radial teleblock copolymers of a vinyl aromatic compound (A) and (A')$_n$ and an olefinic elastomer (B) of the A—B—A'; (B—A—B)$_n$A; A (B—A)$_n$B; or B [(A—B)$_n$B]$_4$ type wherein n is an integer of from 1 to 10 inclusive. These copolymers may be prepared by known methods; see the description given in the U.S. Pat. No. 4,481,331. Commercially available copolymers include for example Kraton G ®-1650 and Kraton G ®-1651 available from Shell Chemical Company. The Kraton G ® has a significant quantity of the residual aliphatic unsaturation removed by selective hydrogenation. Other representative impact modifiers are the synthetic polymeric resin elastomers such as silicone rubber, polyether rubber and ethylene-propylene-diene rubber; diene rubbers, i.e., homopolymers of conjugated dienes having, e.g. 4 to 8 carbon atoms, such as butadiene, isoprene, norbornene, piperylene and chloroprene; and copolymers of dienes such as ethylene with each other or with styrene, acrylic acid, methacrylic acid, or derivatives thereof (e.g., acrylonitrile, methacrylonitrile, acrylic acid, methacrylic acid, butyl acrylate and methyl methacrylate), or isobutylene.

An impact-modifying proportion of the impact modifiers described above is generally within the range of from about 0.05 to 15 parts by weight of the composition, preferably from 3–10 parts, most preferably 4 to 8 parts.

The olefin-vinyl carboxylate copolymers such as ethylene/vinyl acetate copolymers (EVAc) blended into the polycarbonate resins according to the present invention, are also well known polymeric compounds as are the methods of their preparation; see for example the preparative procedure described in U.S. Pat. No. 3,448,178. Although propylene/vinyl propionate, or vinyl butylate copolymers may be used with advantage, the EVAc copolymers are preferred. In general, these ethylene/vinyl acetated copolymers may be prepared by copolymerizing a mixture of ethylene and vinyl acetate in the presence of a catalyst such as oxygen, or an organic peroxide such as t-butyl hydroperoxide, in a tubular reactor under manometric pressures ranging from 1055 kg/cm$^2$ to about 2109 kg/cm$^2$, and at temperatures ranging from 300° to about 250° C. The copolymer thus obtained is separated from the unchanged residual monomer by eliminating, by instantaneous distillation, the unreacted monomers. By varying the conditions of pressure, temperature, concentration of catalyst and the proportion of vinyl acetate in the monomer mixture, one can obtain copolymers of varying molar proportions of ethylene/vinyl acetate and differing inherent viscosities. Other methods of making the copolymers are known, and may be employed. (Also see British Pat. No. 835,466 published May 18, 1960.) Advantageously, the EVAc copolymers employed to prepare the compositions of the present invention will have polymer chain moieties of ethylene and vinyl acetate residues in weight ratios of from about 40:60 to 10:90, preferably 25:75 to 15:85. Such copolymers are available commercially and may have average molecular weights within the range of from about 35,000 to about 70,000.

The compositions of the invention may be prepared by homogeneously blending with a known polycarbonate or copolyester-carbonate resin, a melt-flow enhancing proportion of an olefin/vinyl carboxylate copolymer. The blending may be carried out by use of conventional and known techniques and apparatus for the blending together of two synthetic polymeric resin components. In general, the mixtures of components may be blended by pre-mixing in conventional mixing rolls, dough mixers, Banbury mixers and the like and by blending the pre-mix in an extruder or fluxing it on a mill at an elevated temperature sufficient to achieve a homogeneous melt blending. Upon cooling, the blend may be pelletized and stored for molding into test specimens.

The terms "melt-flow enhancing proportion" and "melt-flow increasing proportion" as used herein means a proportion of olefin/vinyl carboxylate copolymer which when added to a polycarbonate resin or a polycarbonate resin molding composition will lower the melt viscosity of the resin/composition at a given temperature, thereby improving processability of the resin/composition in a given molding procedure. In general, such a proportion will be within the range of from about 1 to 40 parts by weight of the polycarbonate resin, preferably 1 to 35 parts.

The following examples describe the manner and process of making and using the invention and set forth the best mode contemplated by the inventor for carrying out the invention but are not to be construed as limiting the scope of the invention. All parts are by weight. Test results are in accordance with the following test methods.

Intrinsic Viscosity

The intrinsic viscosity of the polycarbonate was measured at a temperature of 25° C. in methylene chloride and is reported in deciliters/gram (dl/g).

Deflection Temperature Under Load (DTUL)

ASTM test method D-648 at a load of 18.6 Kg/cm$^2$.

Notched Izod Impact Strength

ASTM test method D-256; all specimens were 100% ductile at failure, unless otherwise noted.

Melt Flow

ASTM test method D-1238.

EXAMPLES 1–5

A polycarbonate prepared by the reaction of phosgene and bisphenol-A and having an intrinsic viscosity of from about 0.4 to about 0.50 deciliters/gram (dl/g) (LEXAN ® 125; General Electric Co., Mount Vernon, IN.) was provided. Aliquots of the resin provided were blended with a variety of proportions of ethylene-vinyl acetate copolymers (Examples 1–4). In one run, no additive was used (Example 5) as a control. The mixtures were uniformly blended together in a laboratory tumbler and the blend then introduced into a melt extruder. The extrudate was pelletized and the pellets were fed to an injection molding machine to mold test bars of 5.715 cm × 1.27 cm with a thickness of 3.2 mm and 6.4 mm. The moldings were subjected to tests to determine their physical properties. The blend components and the test results are set forth below in the TABLE I.

TABLE I

| Example | LEXAN ® 125 (Parts) | | DTUL °C. | NOTCHED IZOD IMPACT STRENGTH (Kg-cm/cm) | | MF (g/10 min) |
|---|---|---|---|---|---|---|
| | | | | 3.2 mm | 6.4 mm | |
| | | VAE* 611 (Parts) | | | | |
| 1 | 98 | 2 | 127 | 82.7 | 21.3$^0$ | 21.4 |
| 2 | 96 | 4 | 129 | 81.6 | 69.3 | 39.7 |
| 3 | 94 | 6 | 127 | 76.3 | 55.5 | 104.0 |
| | | VAE** 711 (Parts) | | | | |
| 4 | 94 | 6 | 127 | 80.0 | 70.4 | 29.3 |

TABLE I-continued

| Example | LEXAN ® 125 (Parts) | DTUL °C. | NOTCHED IZOD IMPACT STRENGTH (Kg-cm/cm) | | MF (g/10 min) |
|---|---|---|---|---|---|
| | | | 3.2 mm | 6.4 mm | |
| 5 (Control) | 100 | — | 138 | 80.0 | 10.0 | 14.5 |

*COPOL VAE 611; an ethylene-vinyl acetate copolymer with an ethylene:vinyl acetate weight ratio of 22:78; Wacker Chemical Co., Munich, W. Germany.
**COPOL VAE 711; ethylene-vinyl acetate copolymer with an ethylene:vinyl acetate ratio of 17:83; Wacker Chemical Co., supra.

EXAMPLES 6–11

The procedure of Examples 1–5, supra., is repeated except that the LEXAN® 125 as used therein was replaced with a polycarbonate having an intrinsic viscosity of 0.39 to 0.45 dl/g prepared and controlled in its molecular weight by the presence of the regulator (p-tert-butylphenol). The test results are shown below in TABLE II. As a control, the Example 10 was carried out without the addition of any additive to the polycarbonate resin. In the Examples 7–9, a conventional impact strength modifier was included in the composition of the invention.

additive is blended with the LEXAN® 125. The test results are given in TABLE IV, below.

TABLE IV

| Example | PARTS LEXAN ® 125 | VAE 611/ VAE 711 | NOTCHED IZOD IMPACT STRENGTH (Kg-cm/cm) | | MF (g/10 min) |
|---|---|---|---|---|---|
| | | | 3.2 mm | 6.4 mm | |
| 14 (Control) | 100 | — | 80.0 | 9.6$^0$ | 14.5 |
| 15 | 90 | 10/— | 78.9 | 68.8 | 256.8 |
| 16 | 90 | —/10 | 81.6 | 73.6 | 238.4 |

TABLE II

| Example | Parts Polycarbonate | Parts | Parts KM 330*** | Parts EEA** | DTUL (°C.) | NOTCHED IZOD IMPACT STRENGTH (Kg-cm/cm) | | MF (g/10 min) |
|---|---|---|---|---|---|---|---|---|
| | | | | | | 3.2 mm | 6.4 mm | |
| | | VAE 611 | | | | | | |
| 6 | 94 | 6 | — | — | 131 | 81.6 | 68.3 | 167 |
| 7 | 94 | 2 | 3 | 1 | 127 | 78.4 | 64.5 | 34.1 |
| 8 | 92 | 4 | 3 | 1 | 129 | 76.8 | 63.5 | 66.8 |
| 9 | 90 | 6 | 3 | 1 | 130 | 75.7 | 61.9 | 133.6 |
| | | VAE 651* | | | | | | |
| 10 (Control) | 100 | — | — | — | 130 | 79.5 | 9.60 | 20.1 |
| 11 | 94 | 6 | — | — | 129 | 62.4 | 55.4 | 159.0 |

*COPOL VAE 651; an ethylene-vinyl acetate copolymer with an ethylene:vinyl acetate ratio of 21:79; Wacker Chemical Co., Munich, W. Germany.
**Ethylene-ethyl acrylate copolymer; Union Carbide, Bakelite ® DPD-6169.
***Acryloid KM330; an acrylate copolymer prepared as described in U.S. Pat. No. 4,096,202; Rohm and Haas Corp.

EXAMPLES 12–13

The procedure of Examples 6–11, supra., is repeated except that the polycarbonate resin used was prepared by the method of U.S. Pat. No. 3,697,481 in the presence of p-[2,2,4-trimethyl-4-(2-hydroxyphenyl)chroman] (CHM-1) as the molecular weight regulator. No EVAc additive was used in Example 12 as a control. The test results are given in TABLE III, below.

EXAMPLES 17–19

A quantity of LEXAN® 145 polycarbonate resin (General Electric Co., supra.) was provided. To a portion of the resin (Example 17) there was blended 3 parts by weight of an acrylate copolymer impact strength modifier (KM330, supra.) and 1 part by weight of ethylene-vinyl acetate copolymer (COPOL VAE-651, su-

TABLE III

| Example | Parts Polycarbonate | Parts VAE 611 | Parts KM 330*** | Parts EEA** | DTUL (°C.) | NOTCHED IZOD IMPACT STRENGTH (Kg-cm/cm) | | MF (g/10 min) |
|---|---|---|---|---|---|---|---|---|
| | | | | | | 3.2 mm | 6.4 mm | |
| 12 (Control) | 100 | — | — | — | 135 | 74.7 | 9.60 | 22.1 |
| 13 | 94 | 2 | 3 | 1 | 133 | 70.4 | 54.4 | 24.1 |

EXAMPLES 14–16

Following the general procedure of Examples 1–5, supra., LEXAN® 125 (90 parts) is melt extruded with 10 parts of COPOL VAE 611, supra. (Example 15) and separately with 10 parts of COPOL VAE 711, supra. (Example 16). In a separate control (Example 14), no pra.). As a control (Example 18) no additives were blended with the resin. As a further control (Example 19) the procedure of Example 19 was repeated except that the ethylene-vinyl acetate copolymer as added therein was replaced with 1 part by weight of EEA, supra. The blends were melt extruded and test specimens tested for physical properties. The test results are set forth in TABLE V, below.

TABLE V

| Example | PARTS LEXAN® 145 | KM/330 EEA/VAE 651 | DTUL (°C.) | NOTCHED IZOD IMPACT STRENGTH (Kg-cm/cm) 3.2 mm | 6.4 mm | MF (g/10 min) |
| --- | --- | --- | --- | --- | --- | --- |
| 17 | 96 | 3/0/1 | — | 83.7 | 76.3 | 16.4 |
| 18 (Control) | 100 | — | 129 | 80.0 | 9.6$^0$ | 14.5 |
| 19 (Control) | 96 | 3/1/0 | — | 83.7 | 76.3 | 9.5 |

EXAMPLES 20–23

Two different polycarbonate resins were provided [LEXAN® 125; and a Chroman-I end capped polycarbonate [CHM-1)]. Each resin was dry blended with three parts of an acrylate copolymer impact strength modifier (KM 330; Rohm and Haas Corp., supra.) and 1 part of COPOL VAE-651, supra. (Examples 21 and 23 respectively.) As controls, dry blends were also made, replacing the COPOL VAE-651 with an equal proportion of EEA, supra. (Examples 20 and 22).

After extrusion of the blends, the specimens showed the test results in TABLE VI, below.

TABLE VI

| EXAMPLE | KM 330/ VAE 651/ EEA | NOTCHED IZOD IMPACT STRENGTH (Kg-cm/cm) 3.2 mm | 6.4 mm | MF (g/10 min) |
| --- | --- | --- | --- | --- |
| LEXAN® 125 | | | | |
| 20 (Control) | 96  3/0/1 | 80.5 | 70.9 | 14.5 |
| 21 | 96  3/1/0 | 78.9 | 70.4 | 19.4 |
| CHM-1 CAPPED | | | | |
| 22 (Control) | 96  3/0/1 | 72.5 | 64.5 | 20.0 |
| 23 | 96  3/1/0 | 72.0 | 62.9 | 28.8 |

What is claimed is:

1. A moldable thermoplastic resin composition of improved processability, which consists essentially of;
   a thermoplastic polycarbonate or copolyester-carbonate resin; and
   a melt flow increasing proportion of an ethylene-vinyl acetate copolymer, within the range of from about 1 to 40 parts by weight of the resin, said copolymer having an ethylene:vinyl acetate monomer residue ratio within the range of from 25:75 to 15:85.

2. The composition of claim 1 which further contains an impact strength modifying proportion of an impact strength modifier.

3. A method of increasing the melt-flow of a thermoplastic polycarbonate or copolyester-carbonate resin molding composition without significantly lowering the impact strength property of an article molded from said composition, which comprises;
   homogeneously blending with said composition from about, 1 to 40 parts by weight of the resin of a melt-flow increasing agent which consists essentially of an ethylene-vinyl acetate copolymer having an ethylene:vinyl acetate monomer residue ratio within the range of from 25:75 to 15:85.

* * * * *